United States Patent Office 3,646,096
Patented Feb. 29, 1972

3,646,096
PURIFICATION OF AROMATIC DIISOCYANATES
Hans P. Horn, Orinda, Calif., assignor to Kaiser Aluminum & Chemical Corporation, Oakland, Calif.
No Drawing. Filed Apr. 9, 1969, Ser. No. 814,841
Int. Cl. C07c *119/04*
U.S. Cl. 260—453 SP    13 Claims

ABSTRACT OF THE DISCLOSURE

Aromatic diisocyanates are treated with zinc-fatty acid salts to remove hydrolyzable chlorine and acidic impurities. The desired results are obtained by utilizing diisocyanate-soluble zinc-fatty acid salts which can be separated from the treated diisocyanate by simple distillation and which are added to the diisocyanate in an effective amount sufficient to reduce the hydrolyzable chlorine and the acidic impurity level. The treated and distilled diisocyanates are suitable for the production of colorless polyurethanes.

BACKGROUND OF THE INVENTION

Commercial production of aromatic diisocyanate such as methylene-diphenyl diisocyanate is usually accomplished by the condensation of aniline with formaldehyde followed by phosgenation of the resulting polyamine to yield polymethylene-polyphenylene polyisocyanate. The polyisocyanate mixture contains a considerable quantity of methylene-diphenyl diisocyanate and separation of the diisocyanate from the polyisocyanate is accomplished by distillation of the diisocyanate. Methylene-diphenyl diisocyanate can also be produced directly by phosgenation of the corresponding diamine. Tolylene diisocyanate is usually prepared from tolylene diamine essentially under the same conditions as the direct preparation of methylene-diphenyl diisocyanate from the corresponding diamine.

Regardless of the manner in which the diisocyanate is prepared, phosgenation produces a crude diisocyanate which is unsuitable for many applications. The usual impurities present in the crude diisocyanate include chlorine-containing compounds which are believed to be the result of phosgenation. These chlorine-containing impurities impart undesirable chemical and physical properties to the diisocyanate as well as to the polyurethanes made therefrom. Removal of these impurities by fractional distillation is only partially successful and additional measures must be taken to reduce these impurities to acceptable levels.

It has been suggested in U.S. Pats. 3,264,336 and 3,373,182 to admix impure organic isocyanates with certain isocyanate-soluble metallic salts, such as cadmium laurate, cadmium naphthenate, zinc naphthenate or mixtures thereof.

Although cadmium laurate is effective in lowering the hydrolyzable chlorine and acidic impurity level of diisocyanates, the degree of elimination is not satisfactory, when the diisocyanate is to be utilized in the production of polyurethane materials. The residual acidic impurity and hydrolyzable chlorine level in the diisocyanate, after the cadmium laurate treatment, is still sufficient to cause discoloration of the polyurethane produced from the treated diisocyanate.

It is, therefore, an object of the present invention to provide an improved method for substantially eliminating the acidic ampurity and hydrolyzable chlorine content of aromatic diisocyanate. The residual impurity, after treatment, will be insufficient to cause deleterious effects such as discoloration and reaction with active hydrogen-containing compounds. This is accomplished by the addition of zinc-fatty acid salts to the diisocyanate contaminated with hydrolyzable chlorine and acidic impurities. When the aromatic diisocyanate, treated according to the process of the present process, is utilized in the manufacture of polyurethanes, it will produce colorless products.

BRIEF SUMMARY OF THE INVENTION

Aromatic diisocyanates are treated with zinc-fatty acid salts to substantially eliminate acidic impurities and hydrolyzable chlorine present in the diisocyanate. The desired result is obtained by treating the diisocyanate in the liquid phase with an effective amount of zinc-fatty acid salt, wherein the fatty acid component is selected from those fatty acids which have at least ten carbon atoms, and melting at a temperature not higher than 90° C. under atmospheric conditions. The treatment of the diisocyanates contaminated with hydrolyzable chlorine and acidic impurities is accomplished at a temperature up to about 280° C., preferably of from about 150° to about 250° C. for a period of at least 1 minute, preferably of from about 5 to about 60 minutes. The hydrolyzable chlorine and acidic impurity level of the treated diisocyanate can be reduced to 0.001% or less within this temperature range and the time period, thereby yielding a purified diisocyanate which is suitable for the manufacture of colorless polyurethanes.

DETAILED DESCRIPTION OF THE INVENTION

Impure aromatic diisocyanates which are to be purified by the process of the present invention can be obtained in various ways. For instance, phosgenation of polyamines produced by the condensation of aniline with formaldehyde produces a mixture of polyisocyanates. This mixture contains a substantial quantity of methylene-diphenyl diisocyanate, and impure methylene-diphenyl diisocyanate can be separated by fractional distillation. It is also possible to obtain crude methylene-diphenyl diisocyanate directly from the corresponding diamine. Tolylene diisocyanate is usually prepared from the corresponding diamine similarly by phosgenation of the corresponding diamine.

These aromatic diisocyanates, obtained by phosgenation, contain impurities as a result of side reactions occurring during phosgenation. The side reactions are believed to be responsible for the formation of acidic impurities and hydrolyzable chlorine atoms. Unless these are removed from the diisocyanates, they will cause the diisocyanate to have undesirable chemical and physical characteristics. For example, acidic and hydrolyzable chlorine containing impurities can react with active hydrogen-containing compounds used in the preparation of polyurethanes. This reaction not only reduces the reactivity of the diisocyanate but also adversely affects the stoichiometry of the urethane formation. Furthermore, the presence of acidic and hydrolyzable chlorine containing impurities also contributes a yellow-brown color to the produced polyurethane. It is, therefore, of great importance to reduce the acidic and hydrolyzable chlorine impurity level in diisocyanates preferably to about 0.001% or less where controlled polyurethane formation is required and where colorless polyurethane products are desired.

Aromatic diisocyanates obtained by phosgenation of diamines usually contain acidic and hydrolyzable chlorine containing impurities in the range of 0.02–0.5% by weight. Addition of metallic salts which are insoluble in the diisocyanate such as zinc chloride or ferric chloride can reduce the acidic impurity and hydrolyzable chlorine level of impure diisocyanates to about 0.001% or below. These compounds, however, are dispersed in the diisocyanate and continuous, direct distillation of the diisocyanate without prior physical separation becomes impractical.

Metallic salts, such as cadmium laurate or zinc naphthenate do not require physical separations prior to distillation. However, other difficulties will arise. For example, in case of cadmium laurate, the acidic and hydrolyzable chlorine containing impurity level of the diisocyanate is only reduced to 0.02%. This level will render the diisocyanate even after the cadmium laurate treatment undesirable for many purposes.

In accordance with the present invention all of the above-mentioned disadvantages are eliminated by treating impure aromatic diisocyanates with soluble zinc-fatty acid salts. The zinc-fatty acid salts suitable for the purposes of the present invention include those zinc-fatty acid salts wherein the fatty acid utilized has at least 10 carbon atoms in its structure and a melting point not higher than 90° C. at atmospheric conditions. These fatty acids include saturated and unsaturated fatty acids, as well as straight chain and branched chain fatty acids. The zinc-fatty acid salt should have at atmospheric conditions a boiling point or decomposition point above the boiling point of the diisocyanate to be treated. Illustrative examples of the zinc-fatty acid compound suitable for the purposes of the present invention include but are not limited to zinc laurate, zinc myristate, zinc palmitate, zinc oleate, zinc stearate, zinc tridecanoate, and zinc pentadecanoate.

The treatment with any of the zinc-fatty acid compounds is carried out by admixing it with the diisocyanate containing the acidic and hydrolyzable chlorine containing impurities. The metallic salts can be either in solid or liquid form, or in the form of a slurry or solution in crude or refined isocyanate, or in an inert solvent. The isocyanate should be in liquid form for best results. The treatment procedure may be carried out at any suitable temperature, however, elevated temperatures are preferred in order to shorten the period necessary to reduce the hydolyzable chlorine and the acidity content to a minimum. It was found that the treatment can be accomplished at lower temperatures, e.g., 50° C. for longer periods, however, for economical purposes, temperatures in excess of 100° C. are preferred. At temperatures from about 150° C. to about 250° C. the treatment period is of from about 1 to about 180 minutes. Temperatures in excess of 280° C. can also be utilized, but at these temperatures the possibility of decomposition increases with an increase in the treatment temperatures.

The treatment of the impure aromatic diisocyanate can be accomplished in a batch, semi-continuous, or continuous manner depending on the equipment available.

After the hydrolyzable chlorine and acidity content is reduced to the desired level, usually to 0.001% or less, the treated diisocyanate is distilled, generally under vacuum. The recovered diisocyanate will be free of impurities. An effective amount of the particular zinc-fatty acid compound is added to the diisocyanate. This usually depends on the amount of acidic and hydrolyzable chlorine impurities present in the particular isocyanate. Within the usual acidic and hydrolyzable chlorine containing impurity levels of from 0.02–0.5% by weight, the amount of zinc fatty acid salt to be utilized is usually of from about 0.01 to about 0.1 mol percent of the isocyanate.

Aromatic diisocyanates treated in accordance with the process of the present invention are useful in the preparation of polyurethane materials. The polyurethane materials produced from the treated aromatic diisocyanate are colorless.

The invention may be further illustrated by the following examples:

Example 1

A round bottom flask equipped with a stirrer was charged with 70 grams of molten impure methylene-diphenyl diisocyanate containing 0.039% by weight of hydrolyzable chlorine. While the molten methylene-diphenyl diisocyanate was stirred, 0.2 gram of zinc laurate was added to the flask. The resulting mixture was heated to 200° C., maintained at this temperature for 10 minutes, and then cooled rapidly with ice water. 50 grams of the treated methylene-diphenyl diisocyanate was then distilled and analyzed for hydrolyzable chlorine. The hydrolyzable chlorine level of the purified methylene-diphenyl diisocyanate was less than 0.001% by weight and the color of the distilled product was slightly yellow. The purified methylene-diphenyl diisocyanate was then converted to a polyurethane polymer and polymer buttons were made which were cured at 100° C. for 16 hours. The produced polymer buttons were colorless.

Example 2

Another 70 grams of molten diphenyl-diisocyanate were treated according to the process described in Example 1 with 0.25 gram of zinc palmitate. The distilled, treated methylene-diphenyl diisocyanate was analyzed and the hydrolyzable chlorine level of the purified methylene-diphenyl diisocyanate was found to be less than 0.001% by weight. Polymer buttons were prepared from this material which were all cured for 16 hours at 100° C. The resulting polymer buttons were colorless.

Example 3

In the same equipment described in Example 1, 70 grams of impure tolylene diisocyanate were added having an acidic impurity level of 0.015% by weight. During stirring, 0.077 gram of zinc laurate was added to the flask. The resulting mixture was heated to 200° C., kept at this temperature for 10 minutes and then cooled. The resulting treated tolylene diisocyanate was distilled and analyzed for hydrolyzable chlorine. The hydrolyzable chlorine content of the treated tolylene diisocyanate was found to be less than 0.001%. A portion of the treated tolylene diisocyanate was utilized for making polyurethane buttons which were cured at 100° C. for 16 hours. The buttons made from the purified tolylene diisocyanates were colorless.

The reduction of acidic impurity and hydrolyzable chlorine level of aromatic diisocyanate encompassed by the present invention is further shown in the following table wherein the effect of temperature and different zinc-fatty acid salts is shown.

TABLE

| Zn compound | Isocyanate | Treatment temp., °C. | Time | Hydrolyzable chlorine level in percent | | Color of polymer button |
|---|---|---|---|---|---|---|
| | | | | Before treatment | After treatment | |
| None | MDI | 200 | 10 min. | 0.04 | 0.028 | Yellow. |
| Zn palmitate | MDI | 200 | 10 min. | 0.04 | 0.001 | Do. |
| Zn laurate | MDI | 200 | 10 min. | 0.04 | 0.001 | Do. |
| Do | MDI | 50 | 6 hr. | 0.04 | 0.006 | Do. |
| Do | MDI | 50 | 24 hr. | 0.04 | 0.005 | Do. |
| Zn oleate | MDI | 200 | 30 min. | 0.04 | 0.001 | Do. |
| None | TDI | 200 | 10 min. | 0.015 | 0.007 | Do. |
| Zn palmitate | TDI | 200 | 10 min. | 0.015 | 0.001 | Do. |
| Zn laurate | TDI | 200 | 10 min. | 0.015 | 0.001 | Do. |

NOTE.—Methylene diphenyl diisocyanate is designated as MDI, tolylene diisocyanate is designated as TDI.

The following analytical methods were employed to report the results shown in the examples:

Hydrolyzable chlorine and acidity impurity content.—A weighed sample of the aromatic diisocyanate was dissolved in 100 ml. methanol under stirring and gentle heating. 200 ml. deionized water and 50 ml. NaOH solution (1.0 N) were admixed with the diisocyanate solution and the admixture was gently boiled for 30 minutes. Subsequently, the admixture was cooled to room temperature by immersion in a water bath. Any solids formed during cooling were dissolved in a small amount of acetone, and 5 ml. concentrated $HNO_3$ (ACS reagent grade) was added. The solution was potentiometrically titrated with 0.02 N $AgNO_3$ solution, using a Beckman potentiometric titrator in combination with a silver electrode. The end-point of the titration was taken as the midpoint of the break in the potentiometric curve. A blank solution without the diisocyanate was also titrated for comparison. The hydrolyzable chlorine content was determined according to the following equation:

$$\text{percent hydrolyzable chlorine as } Cl^- = \frac{(B-A) \times N \times 3.5}{W}$$

where B=mhl. of $AgNO_3$ to titrate sample, A=ml. of $AgNO_3$ to titrate blank, N=$AgNO_3$ normality, W=sample weight.

Polymer button color test.—10 grams of purified diisocyanate were admixed with 16.5 grams of preheated (45° C.) polyol mixture consisting of 15.6 grams of propylene oxide adduct of propylene glycol (molecular weight of about 400, sold as Pluracol P410 by Wyandotte Chemicals Corp.) and 0.9 gram of propylene oxide adduct of 1,1,1-trimethylol propane (molecular weight of about 400, sold as Pluracol TP440 by Wyandotte Chemicals Corp.). The admixture was poured into a mold and maintained at 100° C. for about 16 hours. Subsequent to this period, the color of the formed button-shaped polymer was checked on a Gardner colorimeter.

While certain representative embodiments and details have been shown for the purpose of illustrating this invention, it will be apparent to those skilled in the art that various changes and modifications may be made therein without departing from the spirit and the scope of the invention.

What is claimed is:
1. A process for reducing the hydrolyzable chlorine and acidic impurity level of methylene-diphenyl diisocyanate or tolylene diisocyanate, which comprises

(a) admixing the diisocyanate with an effective amount of isocyanate-soluble, zinc-fatty acid salt, wherein the fatty acid component is selected from the group consisting of fatty acids having at least 10 carbon atoms and melting at not higher than 90° C. under atmospheric conditions,
(b) maintaining the admixture in a liquid phase at a temperature up to about 280° C. for a period of at least about 1 minute, and
(c) recovering the purified diisocyanate.

2. Process according to claim 1, wherein the temperature is of from about 50° C. to about 280° C.

3. Process according to claim 1, wherein the temperature is of from about 150° C. to about 250° C.

4. Process according to claim 3, wherein the acidic impurity level of the diisocyanate is reduced to 0.001% by weight of the diisocyanate.

5. Process according to claim 4, wherein the diisocyanate is methylene-diphenyl diisocyanate.

6. Process according to claim 4, wherein the diisocyanate is tolylene diisocyanate.

7. Process according to claim 5, wherein the zinc-fatty acid salt is zinc laurate.

8. Process according to claim 5, wherein the zinc-fatty acid salt is zinc palmitate.

9. Process according to claim 5, wherein the zinc-fatty acid salt is zinc-oleate.

10. Process according to claim 6, wherein the zinc-fatty acid salt is zinc laurate.

11. Process according to claim 6, wherein the zinc-fatty acid is zinc palmitate.

12. Process according to claim 6, wherein the zinc-fatty acid is zinc oleate.

13. Process according to claim 1, wherein the effective amount of zinc-fatty acid salt is at least equivalent to the amount of acidic impurity and hydrolyzable chlorine content to be removed.

References Cited
UNITED STATES PATENTS

| | | | |
|---|---|---|---|
| 3,264,336 | 8/1966 | Powers | 260—453 |
| 3,373,182 | 3/1968 | Powers | 260—453 |

CHARLES B. PARKER, Primary Examiner

D. H. TORRENCE, Assistant Examiner

U.S. Cl. X.R.

260—45.75, 77.5 AT, 414

UNITED STATES PATENT OFFICE
CERTIFICATE OF CORRECTION

Patent No. 3,646,096  Dated February 29, 1972

Inventor(s) Hans P. Horn

It is certified that error appears in the above-identified patent and that said Letters Patent are hereby corrected as shown below:

Column 1, line 69, "ampurity" should be -- impurity --, and

Column 4, Table (Color of Polymer button), "Do" should be -- Colorless --.

Signed and sealed this 12th day of September 1972.

(SEAL)
Attest:

EDWARD M. FLETCHER, JR.        ROBERT GOTTSCHALK
Attesting Officer              Commissioner of Patents